(12) United States Patent
Casselman

(10) Patent No.: US 8,244,804 B1
(45) Date of Patent: *Aug. 14, 2012

(54) VALIDATION OF DEVICE ACTIVITY VIA LOGIC SHARING

(75) Inventor: Tyler Casselman, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,850

(22) Filed: Sep. 26, 2011

Related U.S. Application Data

(63) Continuation of application No. 13/210,837, filed on Aug. 16, 2011.

(51) Int. Cl.
*G06F 15/16* (2006.01)
*G06F 9/44* (2006.01)
*G06F 7/00* (2006.01)
*G06F 17/30* (2006.01)
*G06F 17/00* (2006.01)
*G06F 19/00* (2006.01)
*A63F 9/24* (2006.01)
*A63F 13/00* (2006.01)

(52) U.S. Cl. ........... 709/203; 463/42; 707/705; 717/115

(58) Field of Classification Search .................. 463/42; 707/705; 709/203; 715/234–242; 717/115–116
See application file for complete search history.

(56) References Cited

U.S. PATENT DOCUMENTS

| 6,941,383 B1 | 9/2005 | Getsin et al. |
| 7,315,830 B1 | 1/2008 | Wirtz et al. |
| 2010/0185930 A1 | 7/2010 | Scott et al. |

OTHER PUBLICATIONS

"Client/Server Code Sharing for Turn-Based Multiplayer iOS", [online]. Mind Juice, Jan. 7, 2011 [retrieved on May 17, 2011]. Retrieved from the Internet: <URL: http://www.mindjuice.net/2011/01/07/clientserver-code-sharing-for-turn-based-multiplayer...>, 9 pgs.

"Share code between client and server", [online]. xamlgeek.net, Apr. 10, 2011 [retrieved on on May 17, 2011]. Retrieved on the Internet: <URL: http://xamlgeek.net/2011/04/10/share-code-between-client-and-server/ >, 5 pgs.

*Primary Examiner* — George C Neurauter
(74) *Attorney, Agent, or Firm* — Schwegman, Lundberg & Woessner, P.A.

(57) ABSTRACT

Methods and systems for validating device activity by way of logic sharing are presented. In an example, a text file comprising a script defining programming logic to be executed in conjunction with an online game is transmitted from a server device via a communication network to a client device. Input data for a client-side application executing at the client device for the online game is received at the client device. The input data is transmitted via the communication network from the client device to the server device. The script is executed at the client device from the client-side application using the input data to produce a first result. The script is also executed at the server device from a server-side application using the input data received from the client device to produce a second result equal to the first result.

19 Claims, 11 Drawing Sheets

Server Methods
— 500

```
/**
 * This is the JSValidator constructor.
 * @param $scriptXML: an XML file containing one or more
 *    sections of Javascript, identified by a string,
 *    along with any parameters to be passed to the
 *    script.
**/
function __construct($scriptXML);   Constructor
                                    Method
                                    — 502

Script
                                                Execution
                                                Method
                                                — 504
/**
 * This method executes a script in the XML file,
 *    returning the output.
 * @param 1: String identifying the script.
 * @params 2 - (N-1): Scalar variables passed to the
 *    script as parameters.
 * @return: Result of the script as a string.
**/
function executeScript();
```

FIG. 5A

```
/**
 * This method downloads and parses the XML file
 *    containing the Javascripts, storing them in
 *    a format that is easily consumed.
 * @param url: The URL to the XML file located on the
 *    server.
**/
- (void)setXMLURL:(NSString *)url;   Script        Script
                                     Access       Execution
                                     Method       Method
                                     — 512        — 514
/**
 * This method executes a script in the XML file,
 *    returning the output as a string.
 * @param jsId: String identifying the script.
 * @param ...: Variable-length arguments passed on to
 *    the script as parameters.
 * @return: Result of the script as a string.
**/
- (id)executeScript:(NSString*)jsId, ...;
```

Client Methods
— 510

FIG. 5B

Example Text File
600

```
<scripts>
    <row>
        <id>add</id>
        <params>
            <param>A</param>
            <param>B</param>
        </params>
        <script>retVal = A + B;</script>
    </row>
    <row>
        <id>multi</id>
        <params>
            <param>A</param>
            <param>B</param>
        </params>
        <script>retVal = A * B;</script>
    </row>
</scripts>
```

Addition Script — 602

Multiplication Script — 604

FIG. 6

Example Gaming Text File — 700

```
<scripts>
    <row>
        <id>xpAwardedForCropsAtLevel</id>
        <params>
            <param>numCropsJustHarvested</param>
            <param>currentLevel</param>
        </params>
        <script>
            if(currentLevel <= 10)
                retVal = numCropsJustHarvested;
            else if(currentLevel <= 20)
                retVal = numCropsJustHarvested*5;
            else
                retVal = numCropsJustHarvested*10;
        </script>
    </row>
</scripts>
```

Experience Points Script — 702

FIG. 7

Example Client Application Code — 800

```
JSValidator *jsv = [[JSValidator alloc] init];   Object
                                                 Instantiation
                                                 — 802

[jsv setXMLURL:@"http://myremoteserver/js.xml"];  Access
                                                  Method
                                                  Execution
                                                  — 804 int xpAwarded = [[jsv executeScript:
    @"xpAwardedForCropsAtLevel", numHarvestedCrops,
    currentLevel, nil] intValue];              Script
                                               Execution
                                               — 806
```

FIG. 8A

Example Server Application Code — 810

```
$jsv = new JSValidator("js.xml");   Object
                                    Instantiation
                                    — 812

$xpAwarded = $jsv->executeScript(
    "xpAwardedForCropsAtLevel", $numHarvestedCrops,
    $user->currentLevel);         Script
                                  Execution
                                  — 814
```

FIG. 8B

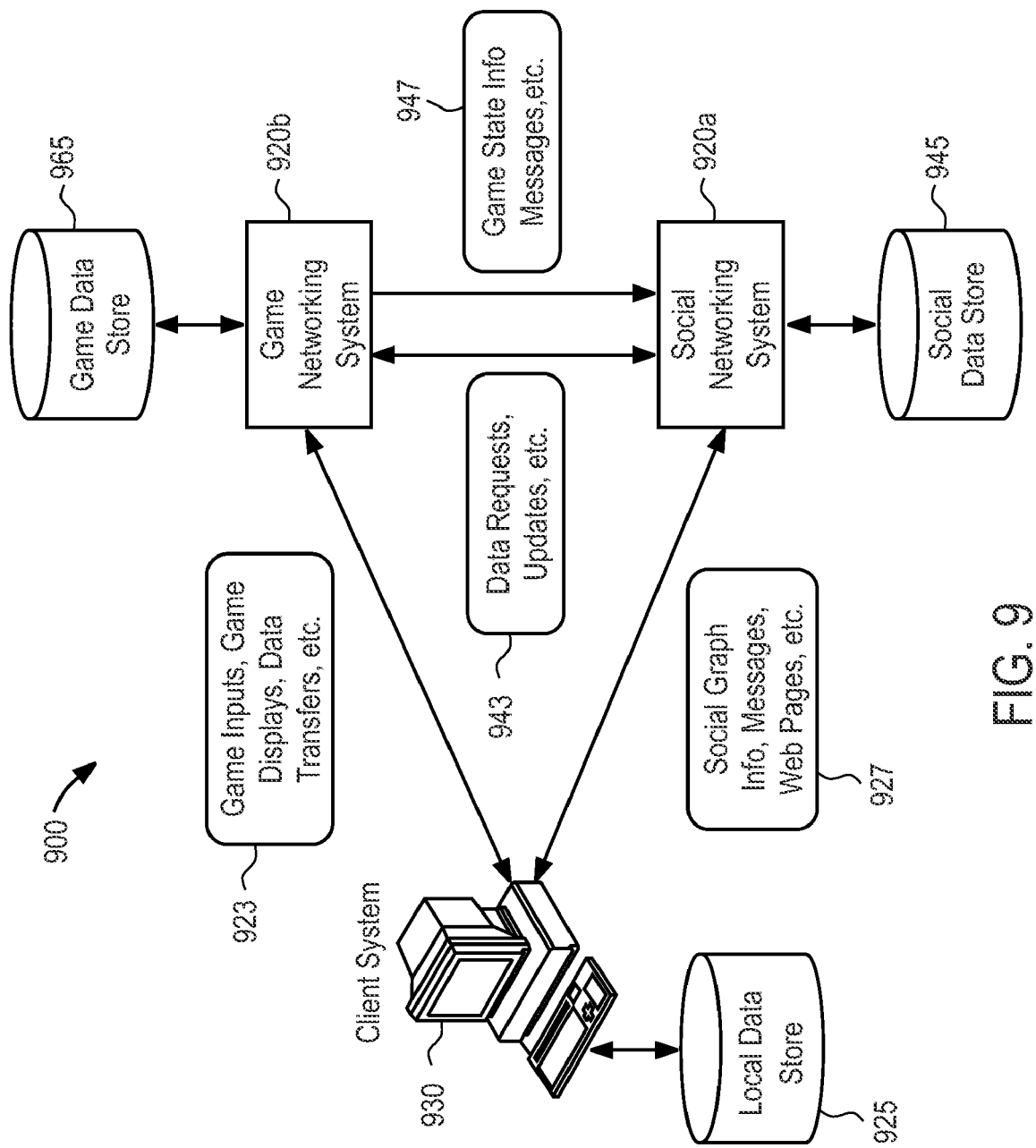

VALIDATION OF DEVICE ACTIVITY VIA LOGIC SHARING

RELATED APPLICATIONS

This application is a continuation of U.S. patent application Ser. No. 13/210,837, entitled "VALIDATION OF DEVICE ACTIVITY VIA LOGIC SHARING," and filed Aug. 16, 2011, which is hereby incorporated herein by reference in its entirety.

TECHNICAL FIELD

The present disclosure relates generally to communication between computing systems, and more particularly to validation of activity in a first device by a second device via sharing of programming logic between the devices.

BACKGROUND

In many client-server online applications, communications between a client and a corresponding server in a client-server relationship are employed to ensure that the state of the application existing in the client is also reflected in the server. Several reasons may exist for the server validation of client activity. For example, an online gaming application may involve the interaction of multiple clients via the server. Thus, actions of one client may be reflected or duplicated in the client so that results of those actions taking place in other clients may be considered in light of the actions of the first client. In other examples, bonuses, such as "experience points" that may be awarded to the user of the client in response to some favorable action by the user, may need to be validated in the server before such bonuses are awarded.

Validation of a client action in the server generally involves at least some communication between the client and the server. In many implementations, a user interaction with a user interface of the client causes a communication to the server which describes the action occurring in the client. The server then processes the action and transmits a reply communication to the client to indicate the results of the action, which may then be presented to the user. Such use of round-trip communications may result in a significant delay of the results of the action being presented to the user, thus negatively impacting the user experience.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings:

FIG. 5A illustrates example server methods for executing programming logic provided in a script in an object-oriented environment;

FIG. 5B illustrates example client methods for executing programming logic provided in a script in an object-oriented environment;

FIG. 6 illustrates an example text file including multiple example scripts;

FIG. 7 illustrates an example text file including an example script for an online gaming environment;

FIG. 8A illustrates example client application code for executing the script of FIG. 7;

FIG. 8B illustrates example server application code for executing the script of FIG. 7;

FIG. 9 illustrates an example data flow between the components of an example system;

DESCRIPTION OF EXAMPLE EMBODIMENTS

Overview

Figure 1:
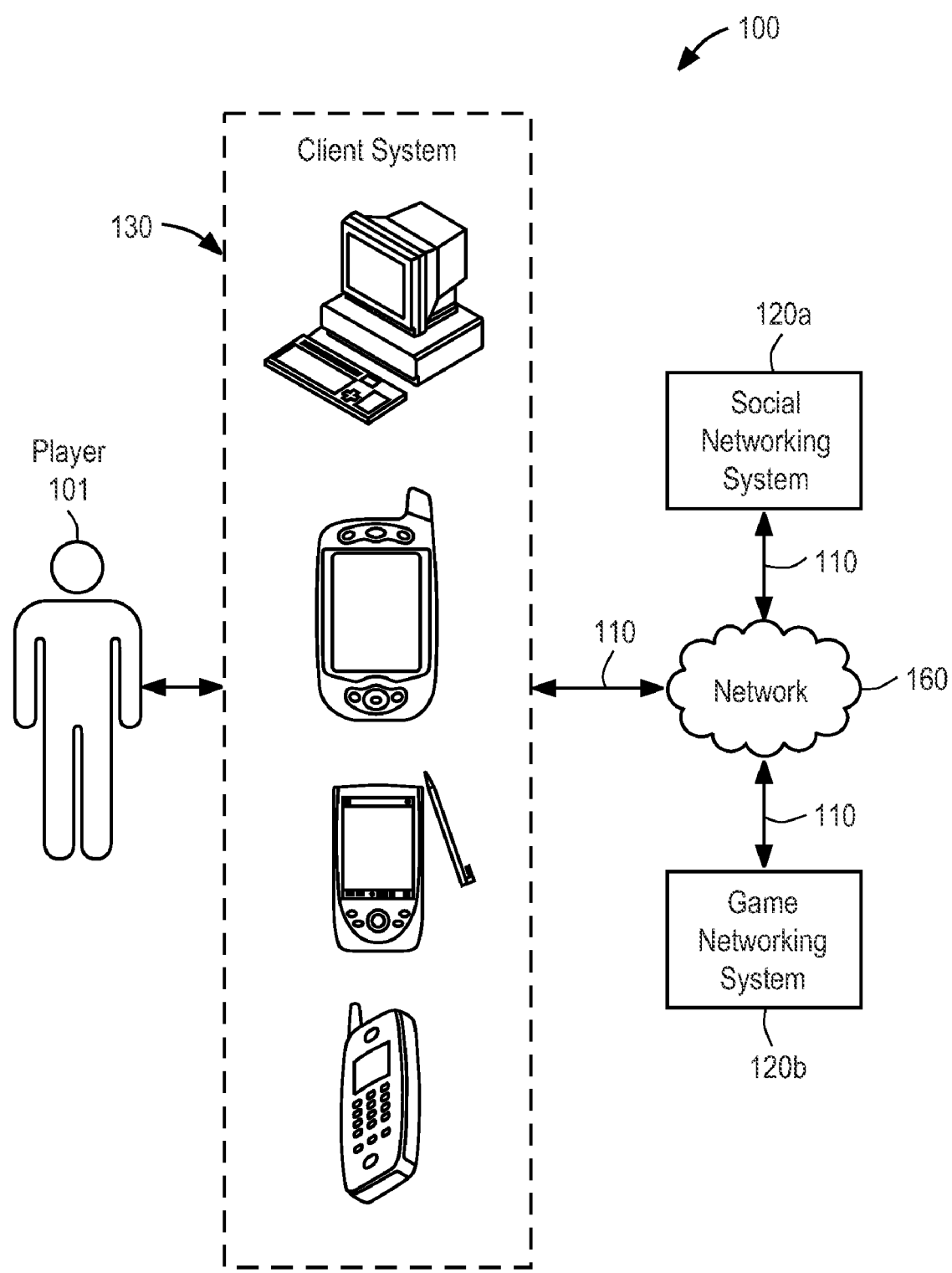
FIG. 1 illustrates an example system for implementing various example embodiments.

To eliminate the need for the round-trip communications between a client and a server so that the server may validate actions occurring in the client, the client may process the actions and then inform the server of the results of those actions. However, a clever user of the client may be able to manufacture, alter, or "spoof" the communications from the client to the server regardless of the actual operation occurring in the client, leading to improper or fictitious results in the server.

In another example, all processing of client actions may be performed in the client to provide the user with immediate feedback regarding the results of the action. The client may also inform the server of the actions, and in response, the server may process the actions in the same way to duplicate and validate the results generated in the client. Under this scenario, the processing logic in both the client and the server are synchronized to ensure the same processing operations are being performed. This synchronization may result in logic updates to the client from the server, which may be difficult to perform and track. Also, if the client portion and server portion of the applications are written in different programming languages, each update to the processing logic in both the client and the server may involve updates being written in the two different languages.

In at least some embodiments described in greater detail below, a single text file that includes a script defining programming logic may be provided to both a client device and a server device. Input data received at the client device may be provided to the server device. The script may then be executed at both the client device and the server device using the input data to produce the same result. In one example, the client and server may form a portion of an online gaming system, with the script receiving input data regarding one or more user actions. In executing the script at both the client device and the server device, the results or output of the script may be presented to the user of the client device as soon as the results have been generated, without awaiting validation, confirmation, or other communications from the server device. Such results may include, for example, experience points, gaming features (such as new tools or weapons), advancement in gaming levels, and/or other game-related data pertaining to the user of the client device. The server device is able to produce the same results that are generated in the client device, and possibly store those results locally for future use. Further, updates to the programming logic need only be incorporated into the text file including the script, and not into the applications being executed by the client and server devices, which may be written in different programming languages. In other examples, the use of a script to be executed in both a client device and a server device may be associated with client-server systems; or even distributed computing systems not employing a client-server architecture, that are not associated with an online gaming system.

Example System

FIG. 1 illustrates an example of a system 100 for implementing various example embodiments. In some embodiments, the system 100 comprises a player 101, a client system 130, a network 160, a social networking system 120a, and a game networking system 120b. The components of the system 100 may be connected directly or over a network 160, which may be any suitable network. In various embodiments, one or more portions of the network 160 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client system 130 may be any suitable computing device, such as a smart phone, a personal digital assistant (PDA), a mobile phone, a personal computer, a laptop, a computing tablet, or any other device suitable for playing a virtual game. The client system 130 may access the social networking system 120a or the game networking system 120b directly, via the network 160, or via a third-party system. For example, the client system 130 may access the game networking system 120b via the social networking system 120a.

The social networking system 120a may include a network-addressable computing system that can host one or more social graphs, and may be accessed by the other components of system 100 either directly or via the network 160. The social networking system 120a may generate, store, receive, and transmit social networking data. Moreover, the game networking system 120b may include a network-addressable computing system for systems) that can host one or more virtual games, for example, online games. The game networking system 120b may generate, store, receive, and transmit game-related data, such as, for example, game application files, game account data, game input, game state data, and game displays.

The game networking system 120b may be accessed by the other components of system 100 either directly or via the network 160. The player 101 may use the client system 130 to access, send data to, and receive data from the social networking system 120a and/or the game networking system 120b, Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and so on.

Although. FIG. 1 illustrates a particular example of the arrangement of the player 101, the client system 130, the social networking system 120a, the game networking system 120b, and the network 160, this disclosure includes any suitable arrangement or configuration of these components of system 100. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

Online Games and Game Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, and game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player 101, updating and/or synchronizing the game state based on the game logic and each input from the player 101, and transmitting instructions to client system 130. As another example and not by way of limitation, each time player 101 provides an input to the game through the client system 130 (such as, for example, by typing on the keyboard or clicking the mouse of client system 130), the client components of the game may transmit the input of the player 101 to game networking system 120*b*.

Shared Logic Examples

Figure 2A:
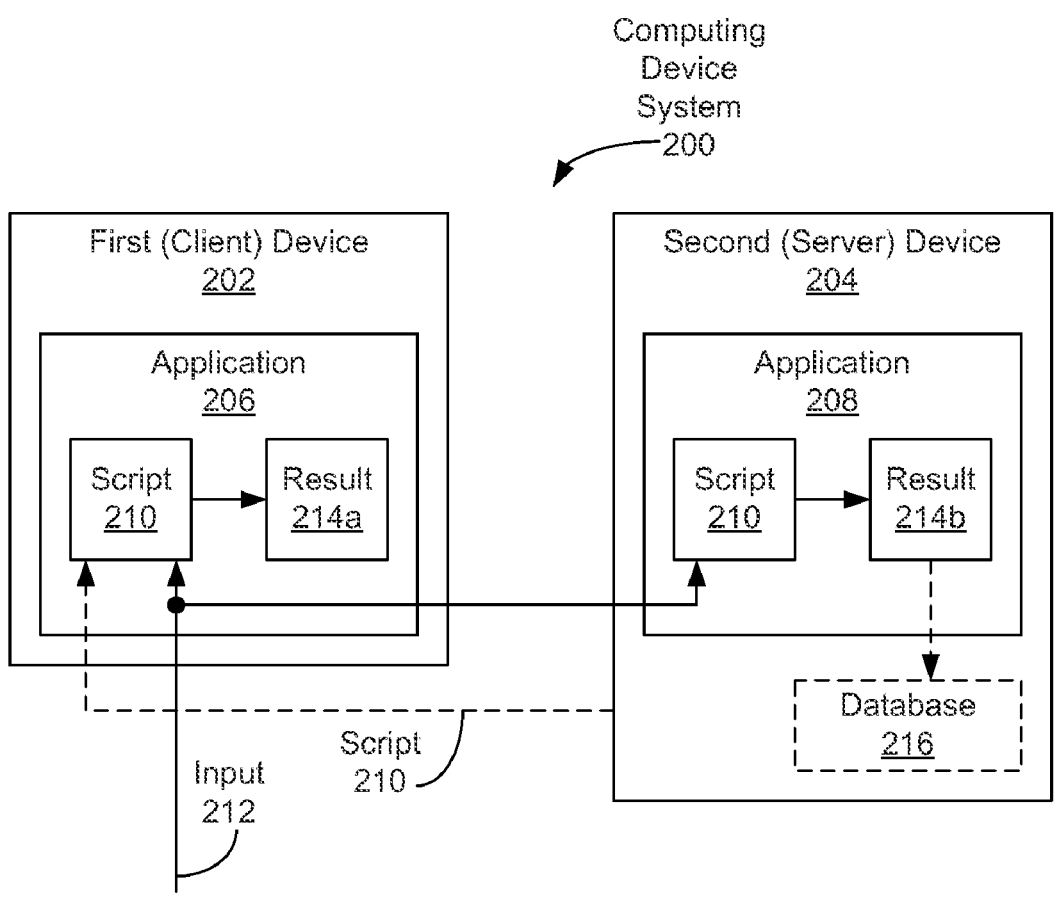
FIG. 2A shows a block diagram illustrating an example computing device system.

FIG. 2A illustrates an example computing device system 200 having a first (client) device 202 and a second (server) device 204. In one example, the first device 202 may be one of the client systems 130 of the system 100, while the second device 204 may represent the game networking system 120*b* of the system 100, as shown in FIG. 1. In other implementations, the first device 202 and the second device 204 may reside within a client-server system not pertaining to an online social networking or game networking environment. Further, while the first device 202 and the second device 204 are hereinafter referred to as the client device 202 and the server device 204 participating in a client-server relationship, the devices 202, 204 may instead be peer devices in a peer-to-peer communication arrangement, or be any two computing devices communicatively coupled together, in other embodiments.

In FIG. 2A, the client device 202 includes an application 206 to be executed, and the server device 204 includes an application 208 to be executed. In an online gaming environment, the application 206 may be a client-side application providing a user of the client device 202 the ability to engage in an online game, as described herein. The application 208 may be a server-side application for facilitating the ability of multiple users (via multiple client devices 202) to engage in playing the online game, including the facilitation of interaction between users within the context of the online game, among other tasks, as discussed herein.

Each of the applications 206, 208 is configured to execute a script 210 which takes input 212 and produces a result 214*a*, 214*b*. In one example, the script 210 is included in a text file that is accessed by both the client device 202 and the server device 204. In some embodiments, the text file may include more than one script 210. Additionally, more than one text file, with each text file containing one or more scripts 210, may be utilized in both the client device 202 and the server device 204. In a further implementation, the script 210 may initially be created or reside in the server device 204, after which the server device 204 may transfer the script 210 to the client device 202 via a communication connection, such as, for example, the Internet or another WAN. Also in an example, the input 212 may be inputs received from a user of the client device 202 as part of the online game.

As a result of executing the script 210 in the client device 202, a result 214*a* is produced. In the online gaming environment, the result 214*a* may be any data relating to the actions or status of the user of the client device 202 in conjunction with the online game, such as experience points, increase in experience or playing levels, in-game awards, new gaming features, and/or the like. Similarly, the server device 204, in executing the same script 210, produces a result 214*b* equal to the result 214*a* generated in the client device 202. In one example, the server device 204 stores the result 214*b* or some representation thereof in a database 216 accessible by, or incorporated within, the server device 204. In one implementation, the database 216 is associated with the user of the client device 202, which may include data regarding a status of the user within the online game.

Figure 2B:
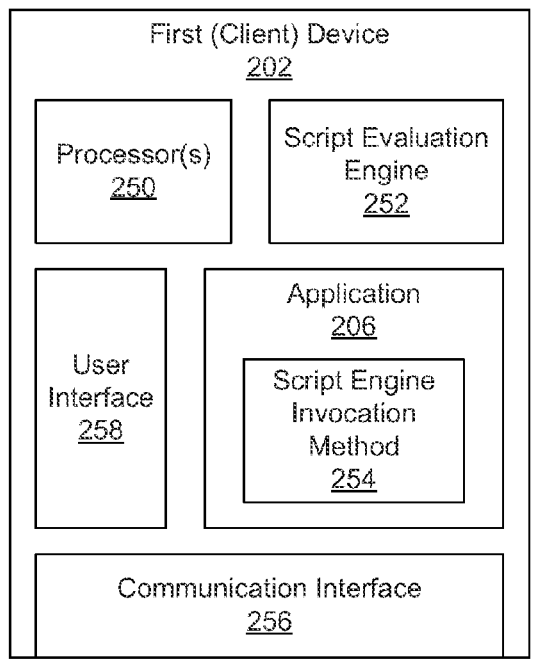
FIG. 2B shows a block diagram illustrating an example client device of the computing device system of FIG. 2A.

FIG. 2B is a block diagram of an example of the client device 202 of FIG. 2A. Included in the client device 202 may be one or more processors 250, a script evaluation engine module 252, an object-oriented script engine invocation method 254 (located in the first application 206 of FIG. 2A in one example), a communication interface 256, and a user interface 258. The processor 250 may be any processor capable of executing instructions of the first application 206. The script evaluation engine 252 may evaluate, interpret, or execute the script 210. In one example, execution of the script 210 may be invoked by the object-oriented invocation method 254 executed from within the first application 206.

The user interface 258 may receive input data 212 from a user of the client device 202 to be used as input for the script 210. In some example, the user interface 258 may include a keyboard, touchpad, touch screen, joystick, mouse, or other user input means. The user interface 258 may also display the results of the execution of the script 210 by way of a visual display component, such as, for example, a liquid crystal display (LCD).

The communication interface 256 may receive the script 210 from the server device 204, transmit the input data 212 to the server device 204, receive user status data generated at the server device 204 from the server device 204, and engage in other communications. In some implementations, the communication interface 256 may be any interface that facilitates communications with the server device 204, as well as other communication nodes. For example, the communication interface 256 may be any interface capable of coupling the client device 202 to a local area network (LAN) (such as, for example, an Ethernet network or an IEEE 802.11x (WiFi®) network) or a wide area network (WAN) (such as the Internet).

Figure 2C:
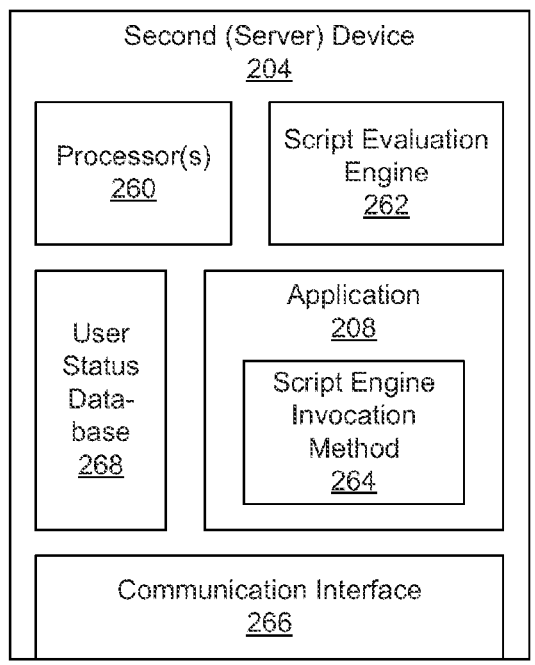
FIG. 2C shows a block diagram illustrating an example server device of a computing device system of FIG. 2A.

FIG. 2C is a block diagram of an example of the server device 204 of FIG. 2A. Included in the server device 204 may be, for example, one or more processors 260, a script evaluation engine module 262, a script engine invocation method 264 (located in the second application 208 of FIG. 2A in one example), a communication interface 266, and a database 268. The processor 260 may be any processor capable of executing instructions of the second application 208, which may be different that the first application 206 executing in the client device 202. The script evaluation engine 262 may evaluate or interpret the script 210, and may be different than the script evaluation engine 252 of the client device 202. In one example, execution of the script 210 may be invoked by an object-oriented invocation method 264 executed from within the second application 208. Further, the invocation method 264 may be different from the corresponding invocation method 254 of the client device 202.

The communication interface 266 may transmit the script 210 from the client device 202, receive the input data 212 from the client device 202, transmit user status data generated at the server device 204 to the client device 202, and engage in other communications. As with the communication interface 256 of the client device 202, the communication interface 266 may be any interface that facilitates communications with the client device 202, such as by way of a LAN or WAN.

The user status database 268 may be any database storage system configured to store the result 214b generated via the execution of the script 210 in the server device 204. In some examples, the result 214b may be transmitted, possibly along with other user status data, via the communication interface 266 to the client device 202. Such data transfer may occur, for example, in response to a subsequent execution of the first application 206 in the client device 202.

Figure 3:
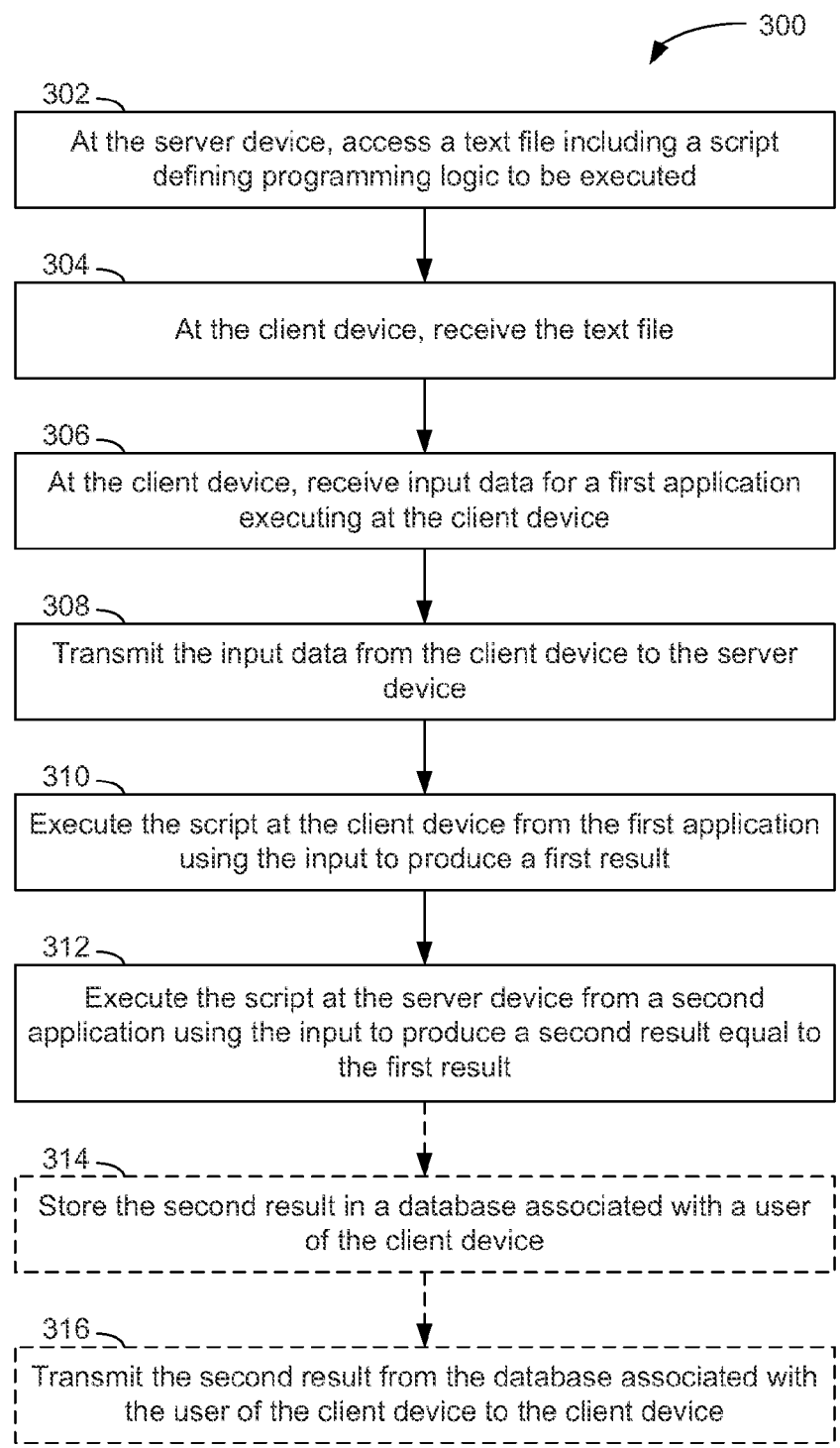
FIG. 3 shows a flowchart illustrating an example method for validating client device action in a server device via logic sharing.

FIG. 3 illustrates a flow diagram of an example method 300 of validating client device activity (such as activity in the client device 202 of FIG. 2A) in a server device (such as the server device 204 of FIG. 2A). In the method 300, a text file including a script 210 defining programming logic to be executed is accessed at the server device 204 (operation 302). The client device 202 receives the same text file (operation 304), possibly from the server device 204. Input data 212 for a first application 206 executing at the client device 202 is received at the client device 202 (operation 306). The input data 212 is transmitted from the client device 202 to the server device 204 (operation 308). The script 210 is executed at the client device 202 from the first application 206 using the input 212 to produce a first result 214a (operation 310). The script 210 is also executed at the server device 204 from a second application 208 using the input 212 to produce a second result 214b equal to the first result 214a (operation 312). In at least one example, the second result 214b may be stored in a database 216 associated with a user of the client device 202 (operation 314). In addition, the second result 214b stored in the database 216 may be transmitted from the server device 204 to the client device 202 (or another client device being employed by the user), such as when the first application 206 is subsequently restarted in the client device 202 (operation 316).

While the flow diagram of FIG. 3 implies a specific order of execution for the operations 302-314 of the method 300, other orders of execution of the operations 302-314, including concurrent or simultaneous execution of one or more of the operations 302-314, may be employed in some examples.

Figure 4:
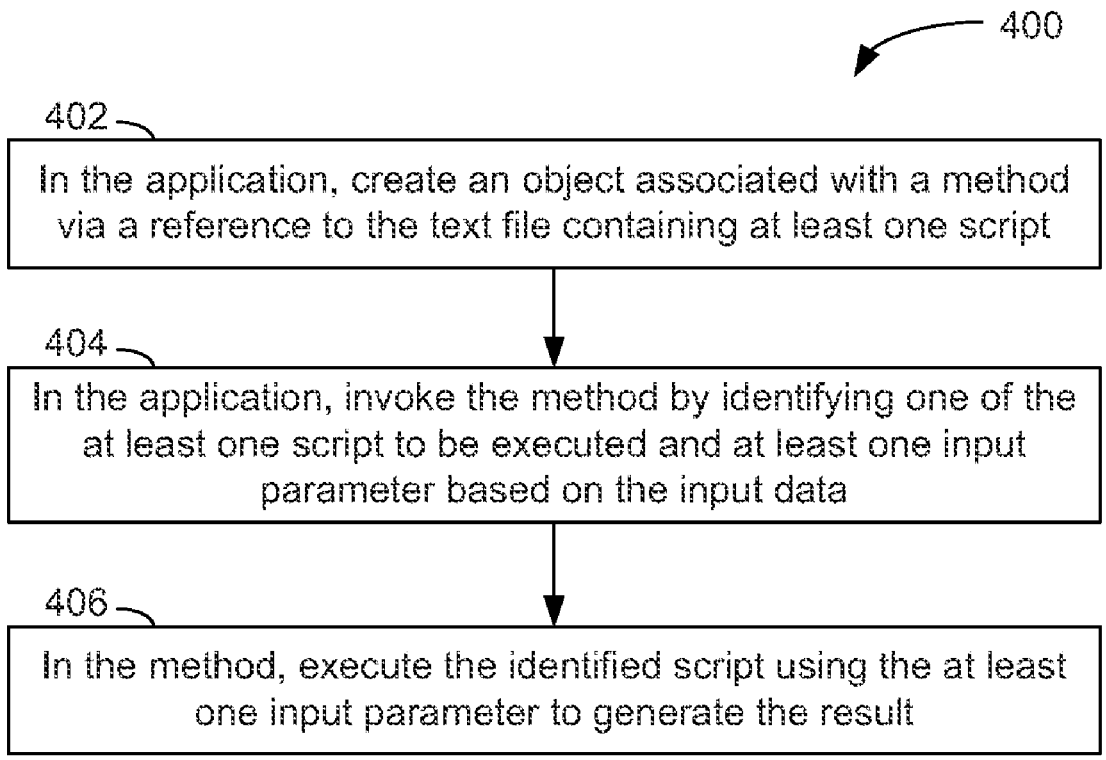
FIG. 4 shows a flowchart illustrating an example method for executing programming logic provided in a script in an object-oriented environment.

FIG. 4 illustrates a flow diagram of an example method 400 of executing the script 210 in either or both of the client device 202 and the server device 204 of FIG. 2A. In the method 400, an object associated with a method is created in an application 206, 208 via a reference to the text file containing at least one script 210 (operation 402). In the application 206, 208, the object-oriented method is invoked by identifying one of the scripts 210 to be executed and at least one input parameter based on the input data 212 (operation 404). In the object-oriented method, the identified script 210 is executed using the at least one input parameter to generate a result 214 (operation 406). Examples of the object-oriented method are described below in conjunction with FIGS. 5A, 5B, 6, 7, 8A, and 8B.

More specifically, FIGS. 5A, 5B, 6, 7, 8A, and 8B illustrate example application code, as what may be found in applications 206, 208 of FIG. 2A, along with example text files, that may be employed to execute the programming logic represented in the script 210. In the examples that follow, the applications 206, 208 to be executed in their respective devices 202, 204 may execute the script 210 by function or method calls provided within the application 206, 208, or via calls to one or more functions or methods provided by an operating system resident on the associated device 202, 204.

In one example, the application 206 of the client device 202 may be an online gaming application to be executed in a user device, such as a mobile phone, PDA, desktop computer, laptop computer, gaming console, and the like. In the specific examples below, the client device application 206 may make calls to methods provided by the iOS operating system supplied by Apple Inc. More specifically, the operating system may provide a library of methods or routines as part of an engine for interpreting, evaluating, or executing scripts written in JavaScript®, an object-oriented scripting language.

Also in the examples to follow, the server device 204 may be a web server or other computing device configured to communicate with the client device 202 over the Internet or another type of communication network. In one example, the application 208 of the server device 204 may be written in PHP, a general-purpose scripting language often employed to produce web pages and other web-based content. In one implementation, the application 208 employs extensions of PHP that provide access to a JavaScript evaluation engine, such as SpiderMonkey.

Given the abovementioned programming environment for the client device 202 and the server device 204, the scripts 210 discussed below are written in JavaScript, although other types of scripting languages may be employed in other embodiments. Also, in the examples below, the text file is formatted in Extensible Markup Language (XML), although other file formats containing the scripts 210 discussed below may be utilized in other implementations.

FIG. 5A illustrates example interfaces of server object-oriented methods 500 to be executed from the application 208 executing in the server device 204 of FIG. 2A. The methods 500 facilitate the creation of an object for one or more scripts 210 provided in a text file, as well as the execution of such scripts 210. An example constructor method 502, labeled "_construct", creates a "JSValidator" object that will contain the programming logic defined in one or more scripts 210 in a text file. The constructor method 502 receives the name of the text file by way of an input parameter $scriptXML. In one example, the constructor method 502 returns no result or output value. In an implementation, the constructor method 502 is called indirectly from the application 208 when the JSValidator object is instantiated. An example XML file is presented in FIG. 6, discussed below.

FIG. 5A also provides an example script execution method 504, named "executeScript", to be executed after the constructor method 502 in response to receipt of input data 212. As shown in FIG. 5A, the script execution method 504 receives two or more parameters, the first parameter being a character or text string identifying the particular script 210 defined within the XML file that was used to construct the JSValidator object. Use of the first parameter is beneficial at least in cases in which more than one script 210 is defined within the XML file.

The second and any additional parameters for executeScript are variables based on the input data 212. In some examples, the variables may represent the input data 212 without modification, or may be generated from the input data in some manner. Further, while the particular example of executeScript in FIG. 5A indicates that the second and additional parameters are scalar variables, other types of parameters, including characters, character strings, data arrays, data structures, JSON (JavaScript Object Notation) objects, and the like, may be employed as parameters in other implementations. In some implementations, executeScript may perform type validation on one or more of the input parameters being passed to the script 210.

Upon execution, the script execution method 504 returns the result 214b). In one example, the result 214b is returned to the calling code of the application 208 as a character string. In other implementations, the result 214b may be returned as another type of result or value. In such cases, the data type of the return value may be specified in the script 210 being executed. The application 208 may then store the result 214b as data related to the user of the client device 202 in the database 216, as shown in FIG. 2A.

Either or both of the constructor method 502 and the script execution method 504 may accomplish at least a portion of its tasks via access to a JavaScript evaluation engine, such the PHP JavaScript extensions (SpiderMonkey).

FIG. 5B illustrates the interfaces for client object-oriented methods 510 to be executed from the application 206 in the client device 202. The methods 510 include a script access method 512 and a script execution method 514. The script access method 512, named "setXMLURL", facilitates the downloading and parsing of the same XML text file utilized in the server device 204, as described above. The script access method 512 accepts an input parameter labeled "url", which is a character string including a Uniform Resource Locator (URL) by which the client device 202 may retrieve the XML file via the Internet or another communication network. In one implementation, the script access method 512 retrieves the XML file from a communication node, such as the server device 204. In one example, the script access method 512 is executed after a JSValidator object has been created, as is shown in FIG. 8A, described below. In another example, the script access method 512 may also serve as a constructor method for creating a JSValidator object, as is accomplished via the constructor method 502 of FIG. 5A. In other examples, the input parameter for the script access method 512 may not be a URL, but may instead include other information for locating and retrieving the XML file, such as a file name and/or path.

The script execution method 514 for the client device 202, called "executeScript", accepts at least two input parameters, in a fashion similar to that of the script execution method 504 for the server device 204. The first parameter ("jsId") is a character string identifying the particular script 210 within the XML file that is to be executed. The next one or more parameters are based on the input data 212 received from the user, and are employed by executeScript to return the result 214a to the application 206. As with the script execution method 504, the result of the script execution method 514 is a character string, although other data formats for the result 214a may be used in other examples.

FIG. 6 illustrates an example text file 600 in XML format which defines two separate scripts 210: an addition script 602 and a multiplication script 604. In this particular example, the extent of the scripts 602, 604 is defined via "scripts" tag, while each individual script 602, 604 (and associated script identifiers and input parameters) is delimited via "row" tags. For each script 602, 604, an identifier (delimited by "id" tags), a list of input parameters (bounded by "params" tags), and the script itself ("bounded by "script" tags) is provided. For example, the addition script 602 is associated with the "add" identifier, receives two input parameters (A and B), and returns a result ("retVal") with a value equal to the sum of the input parameters. Similarly, the multiplication script 604 is identified by the string "multi", receives two input parameters (A and B), and returns a result ("retVal") with a value equal to the product of the input parameters. While the example text file 600 includes two scripts 602, 604, other text files may include one or more scripts.

FIG. 7 illustrates an example gaming text file 700 that may be employed in an online gaming environment, such as FarmVille™, produced by Zynga®, Inc. The XML file 700 includes a script 702 calculating the number of experience points a user earns based on a number of virtual "crops" recently harvested and a current experience level of the user. The script 702, named "xpAwardedForCropsAtLevel", receives two parameters: "numCropsJustHarvested" and "currentLevel". In one example, numCropsJustHarvested is based at least partially on user input provided by the user, such as by way of a user interface of the client device 202, while currentLevel may be stored as a value indicative of user status in both the client device 202 and the server device 204.

More specifically, the experience points script 702 defines programming logic in which a user is awarded a number of experience points equal to the number of crops just harvested if the current experience level of the user is less than ten. If the current experience level of the user is greater than or equal to ten, and less than twenty, the number of experience points awarded is five times the number of crops harvested. Otherwise, the number of experience points awarded is ten times the number of crops harvested. In the specific example of FIG. 7, the term for the comparator "less than" is the escape sequence "<", as the typical less-than character "<" is a special character employed for tags in XML. Other characters, such as "greater than" (">") may be handled in a similar manner.

FIGS. 8A and 8B provide example application code for the client device 202 and the server device 204 for executing the script 702 of FIG. 7. In FIG. 8A, the client application code 800 includes an Object instantiation 802, an access method execution 804, and a script execution 806. As in one example mentioned earlier, the client application code 800 may cause the execution of the script 702 via the JavaScript engine built into the iOS operating system employed by several mobile communication devices, such as the iPhone® and iPod® Touch by Apple, Inc. Other options for executing the JavaScript code in the XML file, such as a JavaScript engine accessible via the Android operating system by Google Inc., may be employed in other examples.

In the object instantiation 802, the application 206 causes an instantiation of a JSValidator object (labeled "jsv") associated with the script 702 to be executed. In one example, the class associated with the object is defined in the application 206. In at least one example, the instantiation of the object may include any memory allocation and initialization of the object in an example. In addition, an access method execution 804 may be performed by calling the script access method 512 (FIG. 5B) associated with the instantiated object (jsv) to set a URL by which the object may download and parse the script 702. In this particular example, the URL is "http://myremoteserver/js.xml". In one implementation, "myremoteserver" is a URL address for the server device 204. In some cases, the script access method 512 may not be employed if the location or address of the XML file 700 is set, and the file 700 is downloaded, in response to instantiating the object.

At one or more points during execution of the application 206, the client device 202 may receive input data 212, such as from a user of the client device 202 via a user interface. In this example, the input data 212 reflects a number of crops the user has harvested recently in the game. In response to receiving the input data 212, the application 206 may perform the script execution 806 shown in FIG. 8A, in which the application 206 calls the script execution method (executeScript) 514 of FIG. 5B associated with the instantiated object, passing to executeScript the identifier for the experience points script 702 ("xpAwardedForCropsAtLevel"), along with the input parameters expected by executeScript. In this example, the variable "numHarvestedCrops" holds the current number of crops harvested by the user, and the variable "currentLevel" specifies the current experience level of the user. As discussed earlier, the number of harvested crops may be retrieved directly from, or based upon, the input data 212, while the current user experience level may be maintained within a data storage area of the client device 202. In response to the call to executeScript, the script 702 is executed using the input parameters to yield the result 214a, which may be expressed as a character string. The result 214a may then be converted to, or interpreted as, an integer value (intValue), which is stored in an integer variable (xpAwarded). In one example, the result 214a may then be presented to the user via the user interface of the client device 202 without awaiting any action from the server device 204.

FIG. 8B illustrates example server application code 810 that may be executed in the application 208 on the server device 204. As with the example client application code 800, the server application code 810 may include an object instantiation 812 and a script execution 814. In an embodiment, the application 208 may be written in the PHP language, and access a JavaScript engine (such as SpiderMonkey, which is supplied through extensions of the PHP language) in order to initiate execution of the script 702.

In the object instantiation 812, the application 208 passes the name of the XML file containing the script 702 (js.xml) to the constructor method 502 (FIG. 5A) while instantiating a new JSValidator object that is referred to via the object name "jsv". In this example, the XML file (js.xml) is accessible locally to the server device 204. In other instances, the XML file may be located in a different server accessible via the Internet or another communication network, and thus may be addressed via a URL or another addressing mechanism in a manner similar to that employed by the client device 202.

When the server device 204 receives input data 212 from the client device 202, as illustrated in FIG. 2A, the application 208 executing in the server device 204 may initiate the script execution 814 by calling the executeScript method of the instantiated object with the input parameters expected by associated experience points script 702. As discussed in connection with FIG. 7, the parameters are the script identifier (xpAwardedForCropsAtLevel), the number of crops recently harvested by the user ($numHarvestedCrops), and the current experience level of the user ($user->currentlevel). In one example, the number of crops harvested may be represented in the input data 212 received from the client device 202, while the user experience level may be retrieved from data storage coupled with the server device 204, such as the database 216 (FIG. 2A) associated with the user. In another implementation, the user experience level may be supplied in the input data 212.

The value returned from the script 702 is then assigned to the variable "$xpAwarded". In one example, the return value may be saved in the database 216 that is associated with the user (for instance, a binary large object, or "BLOB") and is coupled with the server device 204. The stored value may then be subsequently retrieved to perform other operations associated with the online game.

In at least some of the examples discussed herein, the execution of the same script from applications in both a client and a server may facilitate server validation of operations occurring in the client without the client having to await a validation response from the server. For example, in situations in which a client receives a user input and subsequently presents results from that input to the user, the client may forward the user input to the server, perform the operations desired via the scripts described herein to produce the results internally in the client, and then present those results immediately to the user. Concurrently, the server may receive the user input from the client and perform the same operations using the same script to yield the same results without providing a response to the client, possibly storing those results locally for later use. By providing the user input to the server instead of the results of that input, the server is able to duplicate, and thereby validate, those results, thus preventing any possible spoofing of results in the client while accelerating the presentation of the results to the user.

Additionally, by implementing the programming logic to be executed in both the client and the server by way of a text file, the text file may be downloaded to, or retrieved by, the client each time the client application begins execution, each time the client is powered up, or some other convenient time, quickly and efficiently. Thus, alteration of the logic represented in the scripts of the text file does not require a change to the client application or the server application, thus saving valuable time that might otherwise be wasted in "pushing" a new version or update of the client application to the client device. Moreover, by using the same text file (and, thus, the same scripts) for both the client and the server, the probability of employing different versions of the associated programming logic in the client and the server is reduced considerably.

Systems and Methods

FIG. 9 illustrates an example data flow between the components of system 900. In particular embodiments, system 900 can include client system 930, social networking system 920a, and game networking system 920b. The components of system 900 can be connected to each other in any suitable configuration, using any suitable type of connection. The components may be connected directly or over any suitable network. Client system 930, social networking system 920a, and game networking system 920b can each have one or more corresponding data stores such as local data store 925, social data store 945, and game data store 965, respectively. Social networking system 920a and game networking system 920b can also have one or more servers that can communicate with client system 930 over an appropriate network. Social networking system 920a and game networking system 920b can have, for example, one or more internet servers for communicating with client system 930 via the Internet. Similarly, social networking system 920a and game networking system 920b can have one or more mobile servers for communicating with client system 930 via a mobile network (e.g., GSM, PCS, WiFi, WPAN, etc.). In some embodiments, one server may be able to communicate with client system 930 over both the Internet and a mobile network. In other embodiments, separate servers can be used.

Client system 930 can receive and transmit data 923 to and from game networking system 920b. This data can include, for example, web pages, messages, game inputs, game displays, HTTP packets, data requests, transaction information, updates, and other suitable data. At some other time, or at the same time, game networking system 920b can communicate data 943, 947 (e.g., game state information, game system account information, page info, messages, data requests, updates, etc.) with other networking systems, such as social networking system 920a (e.g., Facebook, Myspace, etc.). Client system 930 can also receive and transmit data 927 to and from social networking system 920a. This data 927 can include, for example, web pages, messages, social graph information, social network displays, HTTP packets, data requests, transaction information, updates, and other suitable data.

Communication between client system 930, social networking system 920a, and game networking system 920b can occur over any appropriate electronic communication medium or network using any suitable communications protocols. For example, client system 930, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

With a client-server environment in which the virtual games may run, one server system, such as game networking system 920b, may support multiple client systems 930. At any given time, there may be multiple players at multiple client systems 930 all playing the same virtual game. In practice, the number of players playing the same game at the same time may be very large. As the game progresses with each player, multiple players may provide different inputs to the virtual game at their respective client systems 930, and multiple client systems 930 may transmit multiple player inputs and/or game events to game networking system 920b for further processing. In addition, multiple client systems 930 may transmit other types of application data to game networking system 920b.

In particular embodiments, a computed-implemented game may be a text-based or turn-based game implemented as a series of web pages that are generated after a player selects one or more actions to perform. The web pages may be displayed in a browser client executed on client system 930. As an example and not by way of limitation, a client application downloaded to client system 930 may operate to serve a set of web pages to a player. As another example and not by way of limitation, a computer-implemented game may be an animated or rendered game executable as a stand-alone application or within the context of a web page or other structured document. In particular embodiments, the computer-implemented game may be implemented using Flash-based technologies. As an example and not by way of limitation, a virtual game may be fully or partially implemented as a SWF object that is embedded in a web page and executable by a Flash® media player plug-in. In particular embodiments, one or more described web pages may be associated with or accessed by social networking system 920a. This disclosure contemplates using any suitable application for the retrieval and rendering of structured documents hosted by any suitable network-addressable resource or website.

In a particular embodiment, one or more objects of the virtual game may be represented as a Flash object. Flash may manipulate vector and raster graphics, and supports bidirectional streaming of audio and video. "Flash" may mean the authoring environment, the player, or the application files. In particular embodiments, client system 930 may include a Flash client. The Flash client may be configured to receive and run Flash application or game object code from any suitable networking system (such as, for example, social networking system 920a or game networking system 920b). In particular embodiments, the Flash client may be run in a browser client executed on client system 930. A player can interact with Flash objects using client system 930 and the Flash client. The Flash objects can represent a variety of in-game objects. Thus, the player may perform various in-game actions on various in-game objects by making various changes and updates to the associated Flash objects.

In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure describes performing any suitable in-game action by interacting with any suitable Flash object. In particular embodiments, when the player makes a change to a Flash object representing an in-game object, the client-executed game logic may update one or more game state parameters associated with the in-game object.

To ensure synchronization between the Flash object shown to the player at client system 930, the Flash client may send the events that caused the game state changes to the in-game object to game networking system 920b. However, to expedite the processing and hence the speed of the overall gaming experience, the Flash client may collect a batch of some number of events or updates into a batch file. The number of events or updates may be determined by the Flash client dynamically or determined by game networking system 920b based on server loads or other factors. For example, client system 930 may send a batch file to game networking system 920b whenever 50 updates have been collected or after a threshold period of time, such as every minute.

In particular embodiments, when the player 101 plays the virtual game on client system 930, game networking system 920b may serialize all the game-related data, including, for example and without limitation, game states, game events, user inputs, for this particular user and this particular game into a binary large object (BLOB) and store the BLOB in a database. The BLOB may be associated with an identifier that indicates that the BLOB contains the serialized game-related data for a particular player and a particular virtual game. In particular embodiments, while a player is not playing the virtual game, the corresponding BLOB may be stored in the database. This enables a player to stop playing the game at any time without losing the current state of the game the player is in. When a player resumes playing the game next time, game networking system 920b may retrieve the corresponding BLOB from the database to determine the most-recent values of the game-related data. In particular embodiments, while a player is playing the virtual game, game networking system 920b may also load the corresponding BLOB into a memory cache so that the game system may have faster access to the BLOB and the game-related data contained therein.

In particular embodiments, one or more described web pages may be associated with a networking system or networking service. However, alternate embodiments may have application to the retrieval and rendering of structured documents hosted by any type of network-addressable resource or website. Additionally, as used herein, a user may be an individual, a group, or an entity (such as a business or third party application).

Figure 10:
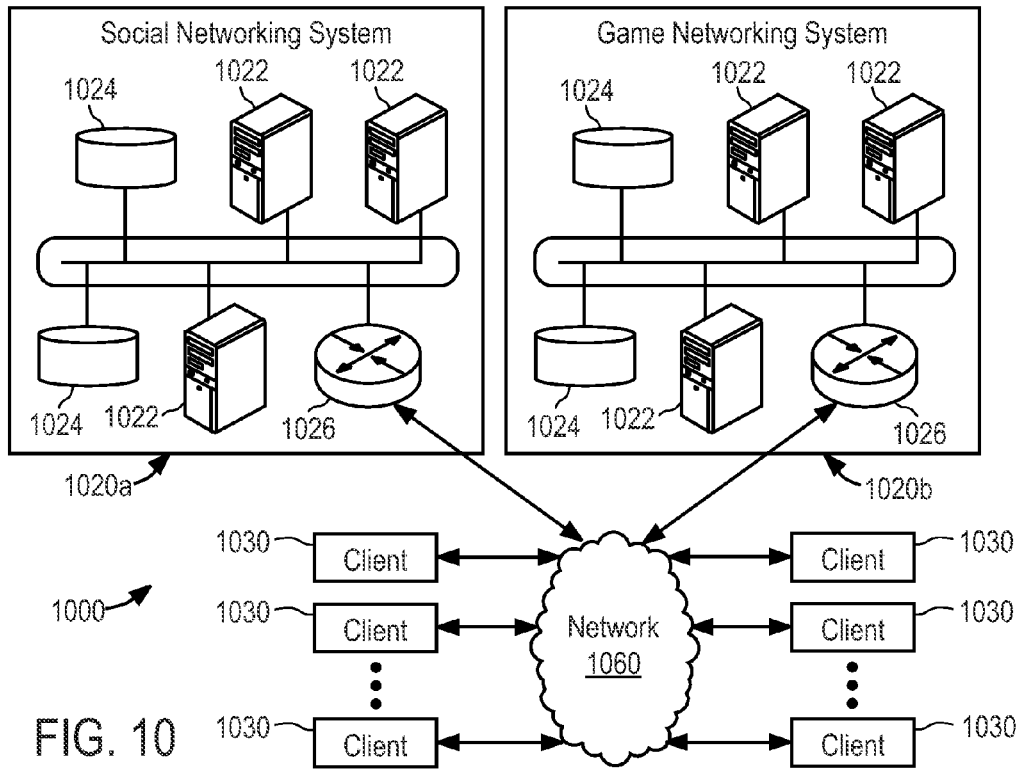
FIG. 10 illustrates an example network environment, in which various example embodiments may operate.

Particular embodiments may operate in a wide area network environment, such as the Internet, including multiple network-addressable systems. FIG. 10 illustrates an example network environment 1000 in which various example embodiments may operate. Network cloud 1060 generally represents one or more interconnected networks, over which the systems and hosts described herein can communicate. Network cloud 1060 may include packet-based wide area networks (such as the Internet), private networks, wireless networks, satellite networks, cellular networks, paging networks, and the like. As FIG. 10 illustrates, particular embodiments may operate in a network environment 1000 comprising one or more networking systems, such as social networking system 1020a, game networking system 1020b, and one or more client systems 1030. The components of social networking system 1020a and game networking system 1020b operate analogously; as such, hereinafter they may be referred to simply as networking system 1020. Client systems 1030 are operably connected to the network environment 1000 via a network service provider, a wireless carrier, or any other suitable means.

Networking system 1020 is a network-addressable system that, in various example embodiments, comprises one or more physical servers 1022 and data stores 1024. The one or more physical servers 1022 are operably connected to network cloud 1060 via, by way of example, a set of routers and/or networking switches 1026. In an example embodiment, the functionality hosted by the one or more physical servers 1022 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 1022 may host functionality directed to the operations of networking system 1020. Hereinafter servers 1022 may be referred to as server 1022, although server 1022 may include numerous servers hosting, for example, networking system 1020, as well as other content distribution servers, data stores, and databases. Data store 1024 may store content and data relating to, and enabling, operation of networking system 1020 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 1024 corresponds to one or more of a variety of separate and integrated databases, such as relational databases and Object-oriented databases, which maintain information as an integrated collection of logically related records or files stored on one or more physical systems. Structurally, data store 1024 may generally include one or more of a large class of data storage and management systems. In particular embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

Client system 1030 is generally a computer or computing device including functionality for communicating (e.g., remotely) over a computer network. Client system 1030 may be a desktop computer, laptop computer, personal digital assistant (PDA), in or out-of-car navigation system, smart phone or other cellular or mobile phone, or mobile gaming device, among other suitable computing devices. Client system 1030 may execute one or more client applications, such as a web browser (e.g., Microsoft Internet Explorer, Mozilla Firefox, Apple Safari, (Google Chrome, and Opera), to access and view content over a computer network. In particular embodiments, the client applications allow a user of client system 1030 to enter addresses of specific network resources to be retrieved, such as resources hosted by networking system 1020. These addresses can be URLs and the like. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a web page may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1030 desires to view a particular web page (hereinafter also referred to as target structured document) hosted by networking system 1020, the user's web browser, or other document rendering engine or suitable client application, formulates and transmits a request to networking system 1020. The request generally includes a URL or other document identifier as well as metadata or other information. By way of example, the request may include information identifying the user, such as a user ID, as well as information identifying or characterizing the web browser or operating system running on the user's client system 1030.

The request may also include location information identifying a geographic location of the user's client system 1030 or a logical network location of the user's client system 1030. The request may also include a timestamp identifying when the request was transmitted.

Although the example network environment 1000 described above and illustrated in FIG. 10 is described with respect to social networking system 1020a and game networking system 1020b, this disclosure encompasses any suitable network environment using any suitable systems. As an example and not by way of limitation, the network environment may include online media systems, online reviewing systems, online search engines, online advertising systems, or any combination of two or more such systems.

Figure 11:
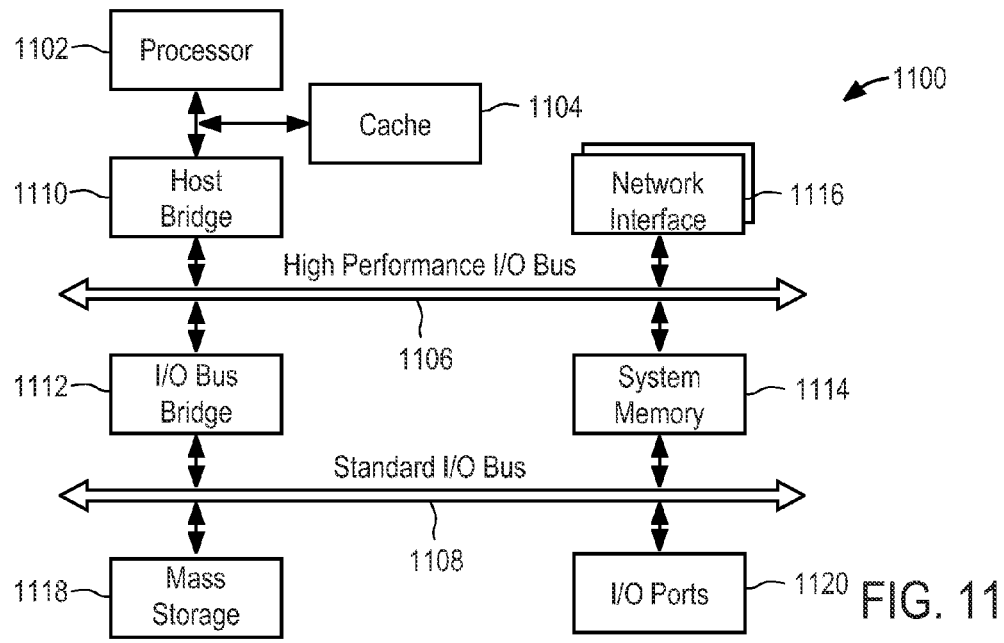
FIG. 11 illustrates an example computing system architecture, which may be used to implement a server or a client system.

FIG. 11 illustrates an example computing system architecture, which may be used to implement a server 1022 or a client system 1030. In one embodiment, hardware system 1100 comprises a processor 1102, a cache memory 1104, and one or more executable modules and drivers, stored on a tangible computer-readable medium, directed to the functions described herein. Additionally, hardware system 1100 may include a high-performance input/output (I/O) bus 1106 and a standard I/O bus 1108. A host bridge 1110 may couple processor 1102 to high-performance I/O bus 1106, whereas I/O bus bridge 1112 couples the two buses 1106 and 1108 to each other. A system memory 1114 and one or more network/communication interfaces 1116 may couple to bus 1106. Hardware system 1100 may further include video memory (not shown) and a display device coupled to the video memory. Mass storage 1118 and I/O ports 1120 may couple to bus 1108. Hardware system 1100 may optionally include a keyboard, a pointing device, and a display device (not shown) coupled to bus 1108. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1100 are described in greater detail below. In particular, network interface 1116 provides communication between hardware system 1100 and any of a wide range of networks, such as an Ethernet (e.g., IEEE 802.3) network, a backplane, etc. Mass storage 1118 provides permanent storage for the data and programming instructions to perform the above-described functions implemented in servers 822 of FIG. 8, whereas system memory 1114 (e.g., DRAM) provides temporary storage for the data and programming instructions when executed by processor 1102. I/O ports 1120 are one or more serial and/or parallel communication ports that provide communication between additional peripheral devices, which may be coupled to hardware system 1100.

Hardware system 1100 may include a variety of system architectures, and various components of hardware system 1100 may be rearranged. For example, cache memory 1104 may be on-chip with processor 1102. Alternatively, cache memory 1104 and processor 1102 may be packed together as a "processor module," with processor 1102 being referred to as the "processor core." Furthermore, certain embodiments of the present disclosure may not include all of the above components. For example, the peripheral devices shown coupled to standard I/O bus 1108 may couple to high-performance I/O bus 1106. In addition, in some embodiments, only a single bus may exist, with the components of hardware system 1100 being coupled to the single bus. Furthermore, hardware system 1100 may include additional components, such as additional processors, storage devices, or memories.

An operating system manages and controls the operation of hardware system 1100, including the input and output of data to and from software applications (not shown). The operating system provides an interface between the software applications being executed on the hardware system 1100 and the hardware components of the hardware system 1100. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably, and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments of the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
   transmitting, from a server device via a communication network to a client device, a text file comprising a script defining programming logic to be executed in conjunction with an online game;
   receiving, at the client device, input data from a user of the client device for a client-side application of the online game executing at the client device;
   transmitting the input data via the communication network from the client device to the server device;
   executing the script at the client device from the client-side application using the input data to produce a first result;
   presenting, at the client device, the first result to the user immediately following the execution of the script;
   executing the script at the server device from a server-side application of the online game executing at the server device using the input data received from the client device which produces a second result which is a duplicate of the first result; and
   storing, at the server device, the second result in a database representing a status of the user in the online game.

2. The method of claim 1, each of the first result and the second result being produced as a text string.

3. The method of claim 1, the executing of the script at the client device comprising:
   in the client-side application executing on the client device, creating a first object associated with a first method, the first method to receive the text file and at least one input parameter, and the first method to invoke a first script evaluation engine to execute the script on the client device using the at least one input parameter to produce the first result; and
   in the client-side application executing on the client device, initiating execution of the script using the first method by passing a reference to the script and the input data to the first method, the input data being used in the first method for the at least one input parameter.

4. The method of claim 3, further comprising:
   in the client-side application executing on the client device, initiating an access method associated with the first object by passing a communication address to the access method, the access method to retrieve the text file from a communication node using the communication address, the initiating of the access method occurring prior to the initiating of the execution of the script.

5. The method of claim 1, the executing of the script at the server device comprising:
   in the server-side application executing on the server device, creating a second object associated with a second method, the second method to receive the text file and at least one second input parameter, and the second method to invoke a second script evaluation engine to execute the script on the server device using the at least one second input parameter to produce the second result; and
   in the server-side application executing on the server device, initiating execution of the script using the second method by passing a reference to the script and the input data to the second method, the input data being used in the second method for the at least one second input parameter.

6. The method of claim 5, further comprising:
   retrieving a value associated with the user of the client device from a database in response to receiving the input data, the value representing a status of the user in the online game;
   passing the value to the second method to initiate the execution of the script, the value being used in the second method for the at least one second input parameter.

7. The method of claim 1, a programming language of the client-side application executing on the client device being different from a programming language of the server-side application executing on the server device.

8. A device comprising:
   at least one processor;
   at least one memory device storing a plurality of modules comprising instructions executable on the at least one processor, the modules comprising:
   a script evaluation engine; and
   an application for an online game, the application comprising an object-oriented method to invoke the script evaluation engine;
   a user interface to receive user input for the online game from a user of the online game; and
   a communication interface to receive a text file comprising a script defining programming logic to be executed in the application from a second device;
   the application, when executed on the at least one processor, to initiate execution of the script by passing a reference to the script and input data based on the user input to the method to produce a result;
   the user interface to present the result to the user immediately following the execution of the script; and
   the communication interface to transmit the input data to the second device.

9. The device of claim 8, the application comprising a second object-oriented method to initiate the receiving of the text file by passing the second object-oriented method a communication address of a communication node possessing the text file.

10. The device of claim 9, the communication node comprising the second device.

11. The device of claim 8, the communication interface to receive the text file in response to the initiation of the execution of the application.

12. The device of claim 8, the result comprising user points earned in the online game in response to the user input.

13. The device of claim 8, the result comprising a user award earned in the online game in response to the user input.

14. The device of claim 8, the result comprising a playing level attained in the online game in response to the user input.

15. The device of claim 8, the result comprising a gaming feature presented in the online game in response to the user input.

16. The device of claim 8, the result comprising a text string.

17. A device comprising:
   at least one processor;
   at least one memory device storing a plurality of modules comprising instructions executable on the at least one processor, the modules comprising:
   a script evaluation engine; and
   an application for an online game, the application comprising an object-oriented method to invoke the script evaluation engine;

a communication interface to transmit a text file comprising a script defining programming logic to be executed in the application to a second device, and to receive input data representing user input for the application from the second device; and a database system to store user information representing a status of the user in the online game;

the application, when executed on the at least one processor, to initiate execution of the script by passing a reference to the script and the input data to the method to produce a result of the input data which is a duplicate of a second result produced by the second device, and to store the result in the database system as part of the user information.

18. The device of claim 17, the application, when executed on the at least one processor, to retrieve a value of the user information associated with the second device, and to pass the value to the method to produce the result.

19. The device of claim 17, the result comprising a text string.

* * * * *